United States Patent
Meharry

[11] 3,769,783
[45] Nov. 6, 1973

[54] SINGLE DISC CORN STALK CUTTER

[76] Inventor: Roy H. Meharry, R.R.1, New Richmond, Ind. 47967

[22] Filed: Feb. 23, 1972

[21] Appl. No.: 228,565

[52] U.S. Cl. .................................................. 56/63
[51] Int. Cl. .......................................... A01d 45/02
[58] Field of Search ............................ 56/51, 56, 63

[56] References Cited
UNITED STATES PATENTS

| 2,505,952 | 5/1950 | Fergason | 56/63 X |
| 3,662,526 | 5/1972 | Smith | 56/63 |
| 3,654,751 | 4/1972 | Meharry | 56/56 |

Primary Examiner—Louis G. Mancene
Assistant Examiner—J. N. Eskovitz
Attorney—C. David Emhardt

[57] ABSTRACT

A cutting apparatus for severing corn stalks. A single saw-type circular blade is rotatably driven in one embodiment by an electric motor and in another embodiment by a hydraulic motor. Each motor is mounted to a cylindrical tube suspendedly mounted from a plate which is attached to a wheeled vehicle. The plate may be located in a first position providing for the blade axis of rotation to intersect the vertical at an acute angle. The plate may be alternatively located in a second position so the blade axis of rotation will be parallel with the vertical. A safety guard is mounted to the tube partially surrounding the blade and pair of rods mounted to the plate extend outwardly forming a corn stalk funnel to the cutting blade.

6 Claims, 5 Drawing Figures

Patented Nov. 6, 1973

SINGLE DISC CORN STALK CUTTER

BACKGROUND OF THE INVENTION

1. Field of the Invention

This invention is in the field of corn stalk cutters.

2. Description of the Prior Art

A representative sample of the prior art is disclosed in the following U. S. Pats. Nos.: 2,958,175 issued to Sprinkle; 3,025,653 issued to Ackermann; 3,422,610 issued to Wetherell; and, 3,425,198 issued to Schlothauer. Many of these prior art devices utilize multiple blades or arms for severing various portions of the item being cut. Disclosed herein is a cutting apparatus which utilizes only a single blade thereby providing for ease of manufacture and operation. In addition, the single bladed cutting apparatus cleanly severs the item being cut and does not encounter the problems inherent in multiple bladed devices such as trapping of the stalk or leaf between the blades. The leaves of an item such as a corn stalk will not become entangled in a cutting apparatus which utilizes only a single blade.

The cutting devices disclosed in some of the aforementioned patents may be utilized to detassel a corn crop whereas the cutting apparatus disclosed herein may be utilized for detasseling as well as for removing the entire top waste portion of the stalk. The severed waste portion which does not include the leaves will therefore fall onto the ground and not into the combine. Better pollenation is thereby achieved. A pair of rods are disclosed which push the leaves down from the ears thereby allowing the disc to sever the top portion of the stalk without contacting the leaves. The advantages of the cutting apparatus disclosed herein therefore includes minimum leaf loss and also clog-free action. The apparatus is light weight and is easy to install on existing corn harvesters.

SUMMARY OF THE INVENTION

One embodiment of the present invention is an apparatus for cutting corn stalks and comprising first means mountable to a wheeled vehicle and adjustable to a first and second orientation, a single flat disc rotatably mounted to the first means with an axis of rotation intersecting the vertical at an acute angle when the first means is in the first position and with the axis being parallel with the vertical when the first means is in a second position, the flat disc having a continuous saw-edge extending circumferentially around the disc, the cutting edge contacting only the stalks during the cutting thereof, second means mounted to the first means and connected to the flat disc being operable to rotate the flat disc about the axis, a pair of rods having upper proximal ends mounted to the first means and lower distal ends positioned adjacent and beneath the flat disc, the rods forming a funnel to the flat disc for holding the stalks as the flat disc cuts off the top portion of the stalks.

It is an object of the present invention to provide a single bladed cutting apparatus for severing corn stalks.

It is a further object of the present invention to provide a new and improved agricultural cutting apparatus.

Related objects and advantages of the present invention will be apparent from the following description.

DESCRIPTION OF THE PREFERRED EMBODIMENTS

Figure 1:
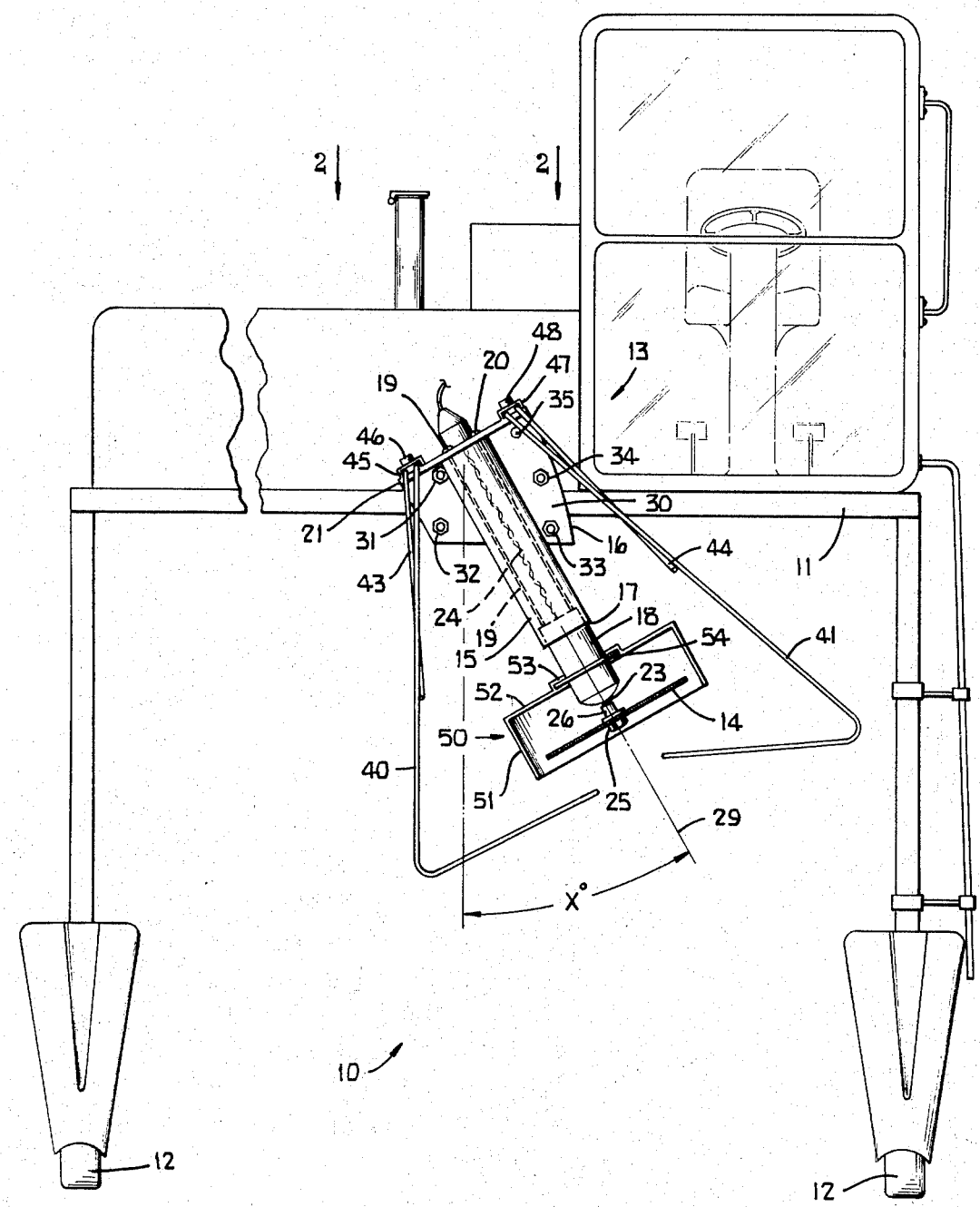
FIG. 1 is a fragmentary front view of a vehicle with the cutting apparatus incorporating the present invention.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
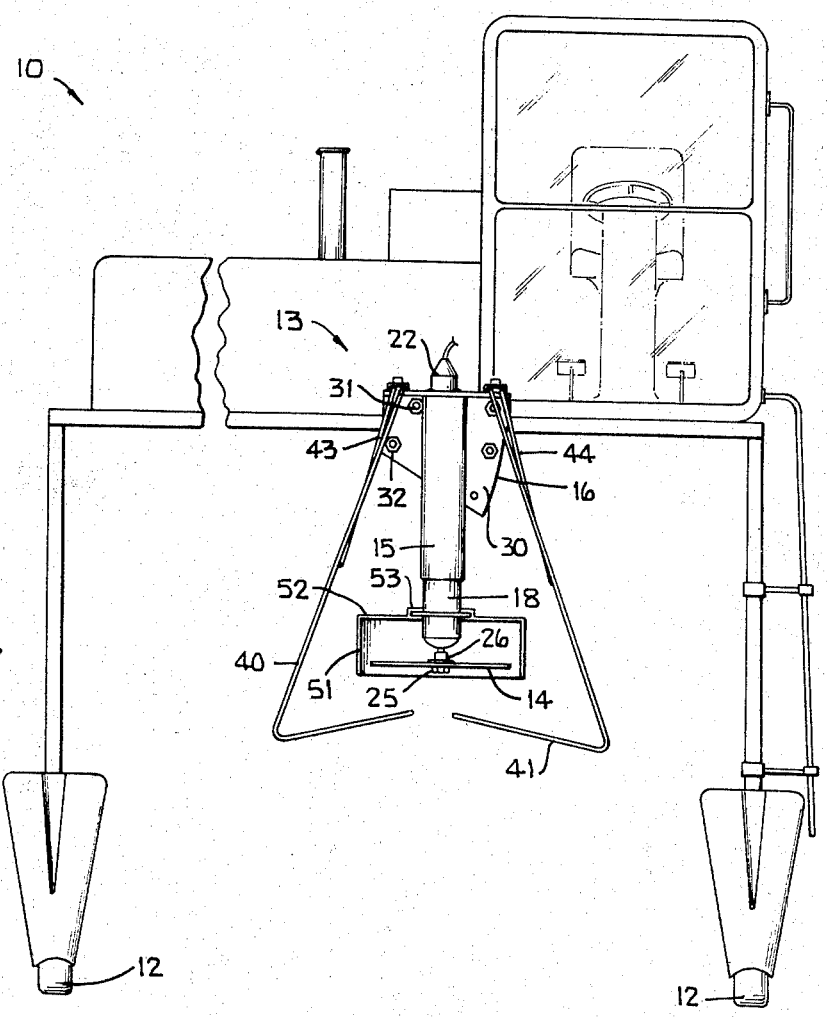
FIG. 4 is the same view as FIG. 1 only showing the apparatus located so as to horizontally position the cutting disc.

Referring now more particularly to FIG. 1, there is shown an apparatus for cutting off the top portions of corn stalks. The front portion of a vehicle 10 which is a corn harvester is shown in FIG. 1. The vehicle has a front frame 11 mounted atop a plurality of wheels 12 sufficiently spaced so as to allow the vehicle to be propelled across a field having parallel rows of corn stalks. The cutting apparatus 13 is removably mounted to frame 11 and may be located in different positions so as to locate flat cutting disc 14 in either a non-horizontal position as shown in FIG. 1 or a horizontal position as shown in FIG. 4.

Figure 2:
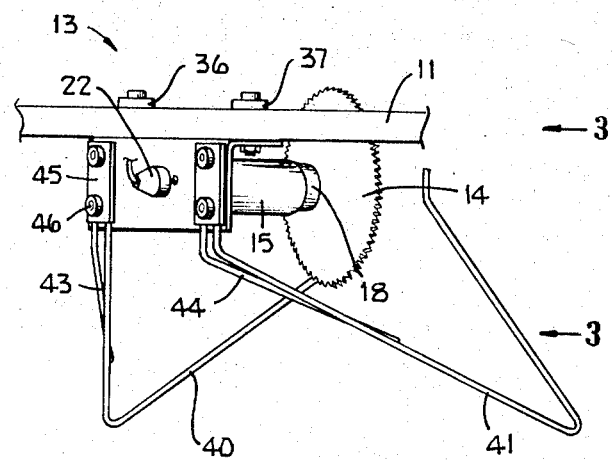
FIG. 2 is a top view of the apparatus of FIG. 1 viewed in the direction of arrows 2—2.
Figure 3:
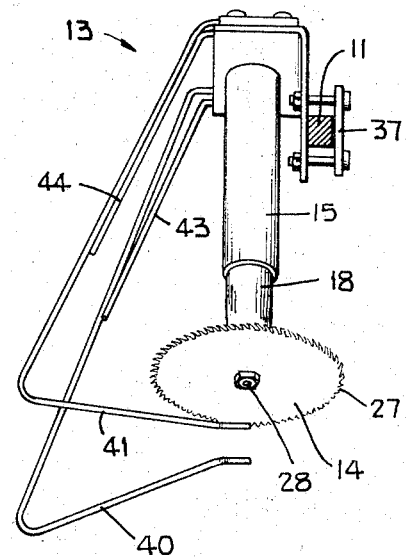
FIG. 3 is an end view of the apparatus of FIG. 2 viewed in the direction of arrows 3—3.

Cutting apparatus 13 has an elongated tube 15 suspendedly mounted from a plate 16 which is securable to frame 11. Flat cutting disc 14 is rotatably mounted below the lower distal end 17 of tube 15. In the first preferred embodiment, an electric DC motor 18 has a portion secured within tube 15 thereby providing for the mounting of the motor to plate 16. The pair of threaded members 19 and 20 extend through the outwardly projecting portion 21 of plate 16 and down through tube 15 being threadedly received by motor 18, which is slip fitted into the bottom end of tube 15. Members 19 and 20 are provided with heads which rest atop the outwardly projecting portion 21 thereby retaining motor 18 partially within tube 15. A standard electrical connector 22 (FIG. 2) is fixedly mounted to the outwardly projecting portion 21 for connecting motor 18 to a source of electrical power. Suitable wiring 24 extends down through tube 15 electrically connecting connector 22 to motor 18. The source of electrical energy may be mounted at some convenient location on the vehicle with suitable controls being provided adjacent to the driver's seat to control the speed of rotation of disc 14. In one embodiment, the electrical motor 18 was of suitable size so as to rotate disc 14 at an approximate speed of 3,200 revolutions per minute. The output shaft 23 of motor 18 extends through disc 14 and is threadedly received by a hexagonally-shaped nut 25. Shaft 23 also extends through spacer 26 which prevents disc 14 from contacting the main body of motor 18. Best results have been obtained by utilizing a single flat disc for cutting the top portions from the stalks. Disc 14 (FIG. 3) has a continuous saw edge 27 which contacts only the stalks being cut during the cutting thereof. That is, the disc does not contact other discs nor does it contact the guide rods or guard to be described later in this specification.

Plate 16 includes a vertical portion 30 (FIG. 1) which is integrally connected to the outwardly projecting portion 21. Portions 21 and 30 are arranged at an approximate right angle. Five holes 31 through 35 are provided in plate 30 to allow the operator to either mount the cutting apparatus in the position shown in FIG. 1 or the position shown in FIG. 4. Best results have been obtained when the axis of rotation 29 of disc 14 intersects the vertical at an approximate angle X of between 30° and 40°. A pair of mounting bars 36 and 37 (FIG. 2) are positioned behind the horizontal portion of frame 11 with each mounting bar having a pair of holes spaced apart the same distance as hole 32 is spaced from 31 and hole 34 is spaced from holes 33 and 35. Four bolts are passed through mounting bars 36 and 37 and then through holes 31 through 34 and are secured thereto by standard hexagonally-shaped nuts. The plate is therefore located in one position so as to automatically provide for an angle X of between 30° and 40°. In order to reposition plate 16 so that axis 29 will be parallel to the vertical, the bolts passing through holes 33 and 34 are removed and are inserted through mounting bar 37 and holes 34 and 35. The hexagonally-shaped nuts may be then threaded onto the bolts and the cutting apparatus is locked in position so that the axis of rotation is vertical (FIG. 4). Tube 15 is rigidly mounted to the outwardly projecting portion 21 by welds or other suitable fastening means.

A pair of rods 40 and 41 have upper proximal ends mounted to the outwardly projecting portion 21 of plate 16 and lower distal ends positioned adjacent and beneath the center portion 28 (FIG. 3) of disc 14. Rods 40 and 41 form a funnel to disc 14 so as to hold the stalks as the disc cuts off the top portion of the stalks. The top ends of rods 40 and 41 as well as the top end of tube 15 are mounted directly to portion 21. The rods project horizontally outward of portion 21 and then diverge apart down to an elevation lower than disc 14. The rods then converge towards the flat disc until the rods are positioned beneath the disc. The rods are then formed so as to be parallel extending beneath and across a portion of disc 14. A pair of strengthening rods 43 and 44 have lower ends respectively welded to rods 40 and 41. The top ends of rods 40 and 43 pass between horizontal portion 21 and a C-shaped bracket 45 mounted atop portion 21 by standard fastening devices 46. Devices 46 may be loosened so as to allow adjustment of the rods 40 and 43 to and from the vehicle. Likewise, the top ends of rods 41 and 44 pass between portion 21 and a C-shaped mounting bracket 47 which is secured to the top of portion 21 by standard fastening devices 48.

A safety guard 50 having a semi-circular side wall 51 which extends approximately halfway around the circumference of disc 14 and projects therebelow is mounted to motor 18. The guard has a top wall 52 which is connected to and extends across side wall 51. The door has an open front and bottom allowing the stalks to pass through the funnel formed by rods 40 and 41 and then through the front of guard 50 to engage the flat disc with the severed portion of the stalks then being allowed to fall through the bottom of the guard. Guard 50 is removed from FIGS. 2 and 3 for the sake of clarity. A semi-circular bracket 54 extends around the cylindrical motor 18 having opposite threaded ends passing through brackets 53 attached to wall 52 and then secured thereto by standard hexagonally-shaped nuts.

Figure 5:
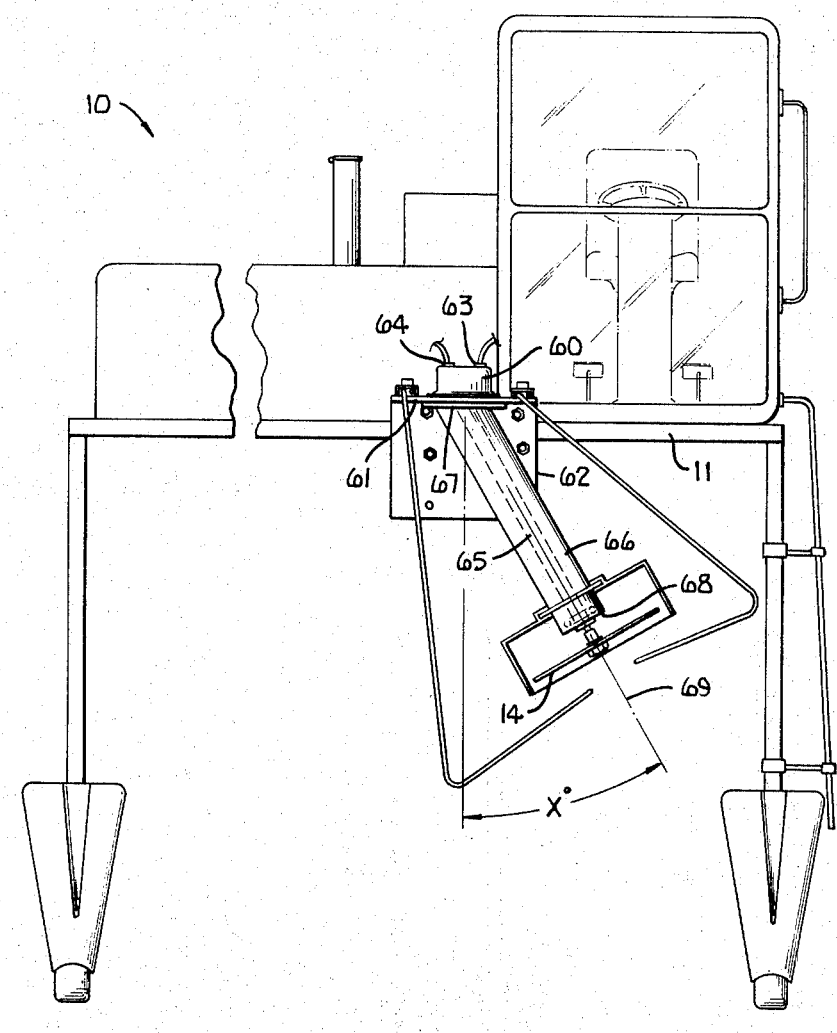
FIG. 5 is the same view as FIG. 1 only showing an alternate embodiment of an apparatus incorporating the present invention.

The embodiment of the invention shown in FIG. 5 is similar to the apparatus shown in FIGS. 1 through 4 with the exception that a hydraulic motor 60 is provided for rotating the disc blade in lieu of electrical motor 18. The hydraulic motor is fixedly mounted atop the outwardly projecting portion 61 of plate 62 secured to frame 11. Hydraulic motors are well known, and thus this specification will not elaborate in great detail thereon. Needless to say, an impeller is provided within the hydraulic motor so as to receive the fluid flowing into the inlet 63 and then passing out through the outlet 64. The impeller is connected to the rotatable output of the motor so as to drivingly engage a shaft 65 which extends centrally through tube 66 mounted to and below portion 61. Tube 66 has a flanged top end 67 which is secured to portion 61 by standard fastening means. The bottom end 68 of tube 66 is provided with bearings mounted therein which bearingly receive shaft 65. Disc 14 is mounted to the end of shaft 65 and is rotatably driven about an axis 69 which intersects the vertical at the same angle X as previously discussed for the embodiment of FIG. 1. Plate 62 is provided with five holes to receive fasteners in a manner similar to that described for plate 16, thereby allowing the positioning of axis 69 so as to be parallel to the vertical. The cutting apparatus of FIG. 5 is provided with a pair of rods similar to rods 40 and 41 and a guard similar to the guard 50. Both embodiments of the cutting apparatus are mountable to the front portion of a corn harvester with the disc being positioned either parallel to the ground or at an angle with respect to the ground. While different diameters of discs may be utilized, best results have been obtained by using either a 10 inch or a 12 inch diameter saw blade. In addition, best results have been obtained by using a disc having a cross cut cutting edge or a rip saw cutting edge.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. An apparatus for cutting corn stalks and comprising:

first means mountable to a wheeled vehicle and adjustable to a first and second orientation;

a single flat disc rotatably mounted to said first means with an axis of rotation intersecting the vertical at an acute angle when said first means is in said first position and with said axis being parallel with the vertical when said first means is in a second position, said flat disc having a continuous saw-edge extending circumferentially around the disc, said cutting edge contacting only said stalks during the cutting thereof;

second means mounted to said first means and connected to said flat disc being operable to rotate said flat disc about said axis;

a pair of rods having upper proximal ends mounted to said first means and lower distal ends positioned adjacent and beneath said flat disc, said rods forming a funnel to said flat disc for holding said stalks as said flat disc cuts off the top portion of said stalks;

elongated means suspendedly mounted from said first means having a lower distal end below which said flat disc is mounted;

a safety guard having a semi-circular side wall extending approximately half way around the circumference of said disc and projecting therebelow, said guard having a top wall connected to and extending across said side wall and being mounted to said motor, said guard having an open front and bottom allowing said stalks to pass through said funnel and said front to engage said flat disc and to allow the severed top stalk portions to pass through the bottom of said guard and wherein said first means is a plate.

2. The apparatus of claim 1 wherein:
said first means is a plate which includes a vertical portion and an outwardly projecting portion integrally connected together at right angles, said vertical portion includes a vertical wall with a first pattern of holes to receive fasteners securing said plate to said vehicle in said first position locating said axis of rotation at said acute angle and with a second pattern of holes to receive fasteners securing said plate to said vehicle in said second position and vertically locating said axis of rotation.

3. The apparatus of claim 2 wherein:
said second means includes an electric motor having an output shaft mountedly receiving said flat disc; and,
said elongated means includes a tube rigidly mounted to said outwardly projecting portion of said plate and further includes threaded members extending through said outwardly projecting portion and said tube and threadedly received by said electric motor which is slip-fitted into said tube, said plate has fastening means operable to allow adjustment of said plate to said first position and said second position.

4. The apparatus of claim 3 and further comprising:
an electric connector for connecting said motor to a source of electrical power being mounted to said outwardly projecting portion and having wires extending down through said tube being electrically connected to said motor.

5. The apparatus of claim 3 wherein:
said rods project horizontally outward of said projecting portion and then diverge apart down to an elevation lower than said flat disc, said rods then converge towards said flat disc to a location beneath the center of said flat disc;

said acute angle is between 30 and 40 degrees; and, said flat disc is rotated approximately 3200 revolutions per minute.

6. The apparatus of claim 2 wherein:
said second means includes a hydraulic motor fixedly mounted atop said outwardly projecting portion of said plate, said motor has a rotatable output, said second means further includes a shaft connected to said rotatable output, said flat disc is mounted directly to and beneath said shaft; and, said elongated means includes a tube rigidly mounted to said outwardly projecting portion of said plate, said tube has a bottom end which bearingly receives said shaft;

said vehicle is a corn harvester and said flat disc is mounted in front of said corn harvester and is parallel to the ground when said plate is in said second position.

* * * * *